United States Patent
Saito et al.

(10) Patent No.: US 6,245,404 B1
(45) Date of Patent: Jun. 12, 2001

(54) OPTICAL DISC

(75) Inventors: Nobuhiro Saito; Minoru Kikuchi; Yoshihiro Akimoto; Fuminori Takase, all of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/252,920

(22) Filed: Feb. 19, 1999

(30) Foreign Application Priority Data

Feb. 26, 1998 (JP) .................................................. 10-045904

(51) Int. Cl.⁷ ........................................................ B32B 3/02
(52) U.S. Cl. ........................ 428/64.1; 428/64.2; 428/64.4; 428/64.5; 428/64.6; 428/913; 428/457; 430/270.13; 430/495.1; 430/945; 369/283; 369/288
(58) Field of Search ................... 428/64.1, 64.2, 428/64.4, 64.5, 64.6, 457, 913; 430/270.13, 495.1, 945; 369/283, 288

(56) References Cited

U.S. PATENT DOCUMENTS

| | | | |
|---|---|---|---|
| 5,368,986 | * 11/1994 | Terao | 430/270 |
| 5,674,659 | 10/1997 | Yoshioka et al. | |
| 5,958,649 | * 9/1999 | Hirotsune | 430/270.13 |
| 5,965,229 | * 10/1999 | Zhou | 428/64.4 |
| 6,004,646 | * 12/1999 | Ohno | 428/64.1 |

FOREIGN PATENT DOCUMENTS

| | | |
|---|---|---|
| 0 356 064 A2 | 2/1990 | (EP) . |
| 0 574 025 A2 | 12/1993 | (EP) . |
| 0 822 543 A1 | 2/1998 | (EP) . |

* cited by examiner

Primary Examiner—Elizabeth Evans
(74) Attorney, Agent, or Firm—Sonnenschein, Nath & Rosenthal

(57) ABSTRACT

The present invention provides an optical disc capable of effectively reducing a reproduction signal jitter value and obtaining a wider record power margin assuring a reproduction limit jitter value to obtain a preferable recording/reproduction characteristic even after a number of times of recording repeated.

The optical disc includes the following films successively formed on a substrate 2: a first dielectric film 3; a phase change recording film 4 whose phase is changed between a crystalline state and an amorphous state thereby to record an information signal; a second dielectric film 5; and a light reflection film formed on the phase change recording film 4 and constituted by an Al alloy containing Cu in a range from 0.1 to 1.0 atomic %.

3 Claims, 5 Drawing Sheets

OPTICAL DISC

RELATED APPLICATION DATA

The present application claims priority to Japanese Application No. P10 045904 filed Feb. 26, 1998 which application is incorporated herein by reference to the extent permitted by law.

BACKGROUND OF THE INVENTION

1. Field of the Invention

The present invention relates to an optical disc comprising on a substrate a recording layer including at least a phase change film changing between a crystalline state and amorphous state, so that this recording layer is heated by a ray radiation so as to cause a phase change for recording and deleting an information. More specifically, the present invention relates to an improvement of materials constituting a light reflection film formed on the recording layer.

2. Description of the Prior Art

As an optical disc for recording and/or reproducing information signals by applying a laser beam, there can be exemplified an optical disc in which an information signal is written beforehand by an emboss pit; a phase change optical disc for writing an information signal by utilizing a phase change between a crystalline state and an amorphous state of a recording layer; and a magneto-optical disc for writing an information signal by utilizing the magneto-optical effect of a recording layer. These optical discs have function films such as a recording layer and a light reflection film on a transparent substrate made from a plastic such as polycarbonate or glass.

In the case of the phase change optical disc, recording, erase, and reproduction are performed as follows. Firstly, this phase change optical disc is subjected to an initialization treatment by applying a predetermined laser beam so that the recording layer is uniformly made into a crystalline state. When recording an information signal on this optical disc, a laser beam of a high-level power (hereinafter, referred to as a recording power) is applied to the recording layer so as to increase the temperature of the recording layer equal to or above its melting point, after which the recording layer is suddenly cooled down so that the portion of the recording layer to which the laser beam has been applied becomes a record mark of the amorphous state.

Moreover, when erasing an information signal which has been recorded on the recording layer, a laser beam of a weaker power than the record power is applied to at least the record mark so that the portion to which the laser beam is applied is heated equal to or above the crystallization temperature but below the melting temperature, after which the portion is suddenly cooled down so that the record mark of the amorphous state becomes crystalized.

Furthermore, in this phase change optical disc, the reflection factor differs between the crystalline state and the amorphous state of the material constituting the recording layer. Accordingly, when reproducing the information signal, the weakest laser beam is applied to the recording layer so as to detect the reflection factor change in the respective states.

Thus, the phase change optical disc does not require means for generating an external magnetic field and accordingly, the size of a recording/reproduction apparatus can be reduced. Moreover, the phase change optical disc can be re-written and produced. This phase change optical disc attracts much attention now.

The recording layer of this phase change optical disc may be made from a phase change material such as a chalcogen compound containing Ge such as Ge—Sb—Te (hereinafter, referred to as Ge chalcogen compound) and a chalcogen compound containing Ag such as Ag—In—Sb—Te (hereinafter, referred to as Ag chalcogen compound). Especially, a phase change optical disc having a recording layer made from the Ge chalcogen compound is known to exhibit a preferable repeated recording characteristic and an excellent repeat durability.

However, even in this phase change optical disc, a further quality improvement is desired as a recording medium of the next generation and there arises following problems.

The phase change optical disc using the Ge chalcogen compound as the material of the recording layer shows a tendency to have a high jitter value of a reproduction signal. Although the phase change disc using the Ge chalcogen compound as, the material of the recording layer has a durability superior to the phase change optical disc using the Ag chalcogen compound, the jitter value suddenly increases as the recording layer is deteriorated after repeated recording of several tens of thousand times. For this, in this phase change optical disc, after repetition of recording a number of times, only a very narrow recording power margin can be obtained for suppressing the jitter value of the reproduction signal below the reproduction limit level.

That is, in this phase change optical disc, after repetition of recording a number of times, the recording power margin enabling to obtain a preferable reproduction signal becomes very narrow.

As a result, in this phase change optical disc, after repetition of recording a number of times, the recording/reproduction failure is easily caused by the recording power fluctuation and the ambient temperature change.

SUMMARY OF THE INVENTION

It is therefore and object of the present invention to provide an optical disc capable of exhibiting a preferable recording/reproduction characteristic by effectively reducing the reproduction signal jitter value and providing a wider recording power margin by assuring a reproduction limit jitter value even after repetition of recording a number of times.

The optical disc according to the present invention includes: a recording layer having at least a phase change film whose phase is changed between a crystalline state and an amorphous state thereby to record an information signal; and a light reflection film formed on the recording layer and constituted by an Al alloy containing Cu in a range from 0.1 to 1.0 atomic %.

In the optical disc according to the present invention having the aforementioned configuration, the light reflection film can have a preferable level of heat conductivity, which in turn enables to obtain an optimal cooling efficiency of the recording layer, so that the phase change film subjected to a beam can change its phase accurately and effectively for an information signal. This reduces the reproduction signal jitter value, and it is possible to obtain a wide record power margin capable of assuring a reproduction limit jitter value even after a repeated recording, thus enabling to obtain a stable recording/reproduction characteristic.

Moreover, in the optical disc according to the present invention, the light reflection film is constituted by an Al alloy containing Cu in the aforementioned range. This enables to obtain an excellent weather resistance of the optical disc.

Consequently, the optical disc according to the present invention can have a preferable recording/reproduction characteristic even after a repeated recording as well as an excellent weather resistance.

DETAILED DESCRIPTION OF PREFERRED EMBODIMENTS

Hereinafter, description will be directed to embodiments of the present invention with reference to the attached drawings.

Figure 1:
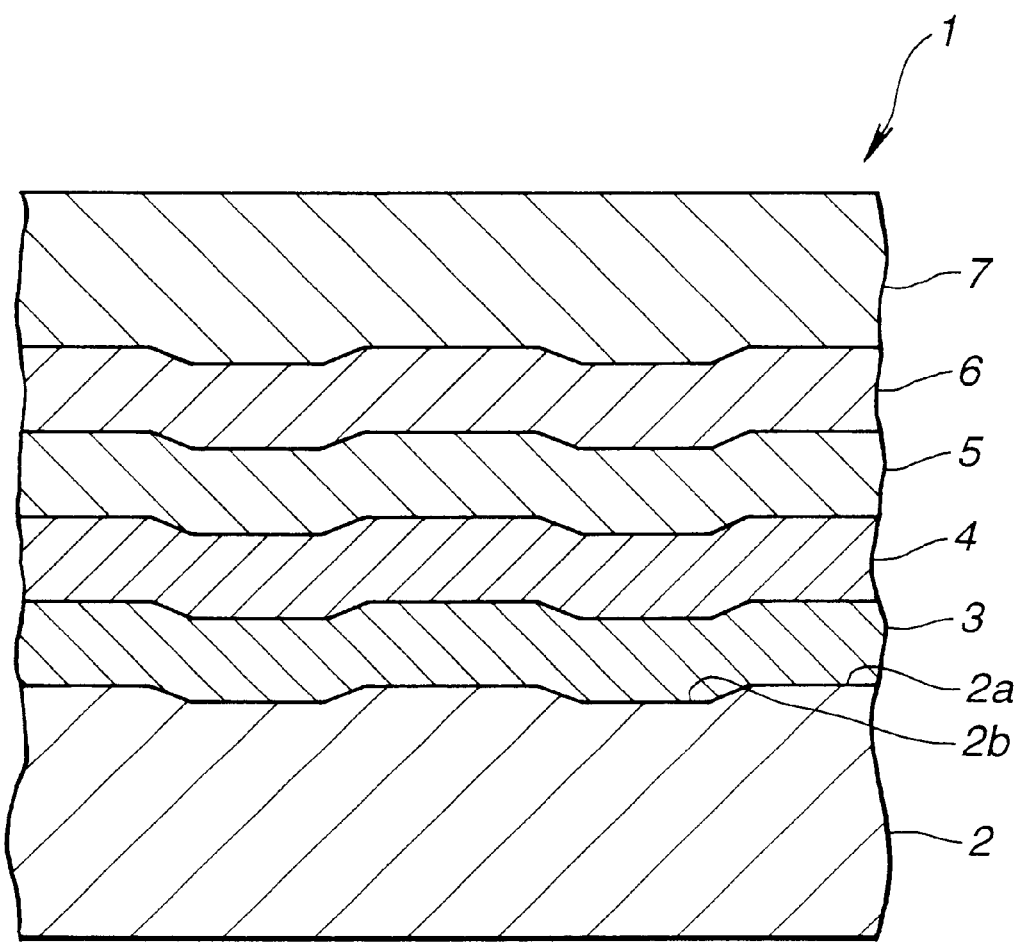
FIG. 1 is a cross sectional view showing an example of an optical disc according to the present invention.

FIG. 1 is an enlarged cross sectional view showing an essential portion of a phase change optical disc according to the present invention.

As shown in FIG. 1, the phase change optical disc according to the present invention includes a substrate 2, a first dielectric film 3, a phase change recording film 4, a second dielectric film 5, a reflection film 6, and a protection film 7 which are successively formed on the substrate 2.

The substrate 2 has a groove 2b formed along a record track on one surface 2a thereof. The substrate 2 has a thickness of, for example, 0.6 mm. Moreover, the substrate 2 may be made from a plastic such as an acrylic resin including polycarbonate (PC) and polymethyl methacrylate (PMMA) or glass. The substrate 2 is formed, for example, by an injection molding or photo-polymer method (2P method).

The first dielectric film 3 is formed on the substrate 2. This first dielectric film 3 is formed for exhibiting the oxidation preventing effect of the phase change recording film 4 and the amplification effect by multi-interference of a laser beam.

This first dielectric film preferably has a film thickness of 70 nm to 130 nm This thickness has been determined as follows.

For example, a phase change optical disc was prepared by successively forming on a substrate a first dielectric film with a thickness of 60 nm, a phase change recording film with a thickness of 25 nm, a second dielectric film with a thickness of 15 nm, and a light reflection film with a thickness of 150 nm. Moreover, a plurality of phase change optical discs were prepared while changing the thickness of the first dielectric film up to 140 nm.

Figure 2:
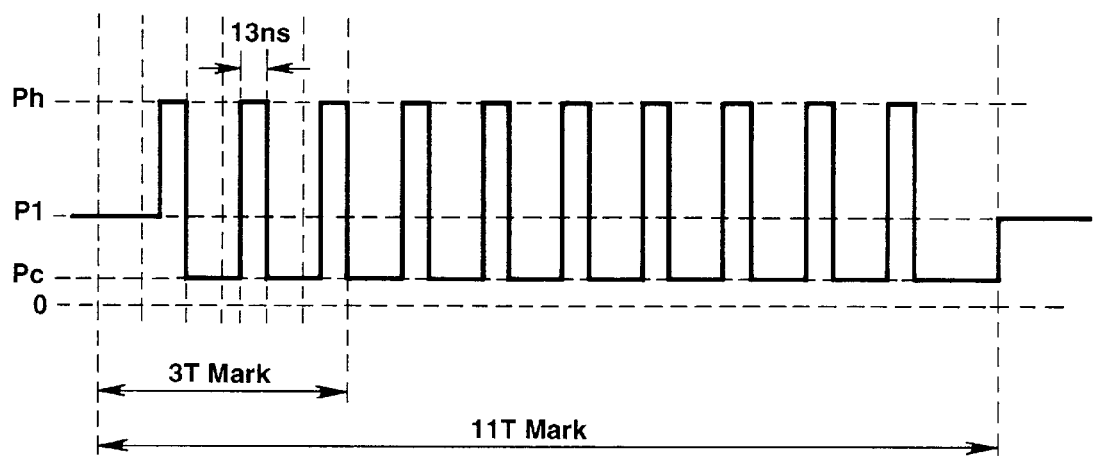
FIG. 2 shows a light emitting pulse used in the example.

Next, these phase change optical discs were initialized and on these phase change optical discs, a random EFM signal was recorded using a light emitting pattern shown in FIG. 2. After this first recording, the reflection factor was measured in the groove. Moreover, recording was repeatedly performed on these phase change optical discs. After 10000 times of recording, the reproduction signal jitter value was determined.

Here, in FIG. 2, the record power is indicated by Ph, the erase power is indicated by Pl, and the cooling power is indicated by Pc. In the light emitting pattern of FIG. 2, one clock is 1T, and one light emitting pulse has a pulse length of 13 ns. Moreover, the repeated recording/reproduction condition was set as follows: the linear velocity 4.8 m/s; the record power Ph, the erase power P1, and the cooling power Pc were set so as to minimize the reproduction signal jitter value at the first recording. By using such a light emitting pulse, it is possible to form a record mark having a size of 3T to 14T for example. This experiment had results as follows.

In the case of the first dielectric film thinner than 70 nm, the reflection factor of the return light was remarkably lowered and it was impossible to obtain a sufficient reproduction signal. Moreover, in the case of the first dielectric film thicker than 130 nm, the reproduction signal jitter value after 10000 tmes of recording was equal to or above 10%, showing an insufficient durability. Consequently, it can be said that the first dielectric film preferably has a thickness in a range from 70 nm to 130 nm.

Furthermore, the first dielectric film 3 may be made from, for example, ZnS, $SiO_x$, $Al_2O_3$, $ZrO_3$, $Ta_2O_5$, $Si_3N_4$, $SiN_x$, $AlN_x$, $MoO_3$, $WO_3$, $ZrO_2$, BN, TiN, ZrN, $PbF_2$, $MgF_2$, or the like. Each of these materials may be used solely or in combination with other materials. Among them, especially preferable is the materials containing at least ZnS, and more preferably ZnS—$SiO_2$. It should be noted that this first dielectric film 3 may be formed, for example, using deposition, ion beam sputter, DC sputter, RF sputter, and other conventional methods.

The phase change recording film 4 is formed on the first dielectric film. This phase change film 4 is made from a phase change material that can reversibly change phase between a crystalline state and an amorphous state. By applying a ray radiation to this phase change material, an information signal can be written or erased on this optical recording layer.

As the phase change material of this phase change recording film 4, there can be exemplified a simple substance such as Te and Se. Moreover, a chalcogen compound can also be used as the phase change material of the phase change recording film 4 such as Ge—Sb—Te, Ge—Te, Ge—Te—Sn, Ge—Te—Sn—au, Sb—Te, Sb—Se—Te, In—T, In—Sb—Te, In—Se—Te—Ag, In—Se, In—Se,Tl, In—Se—Tl—Co, In—Se—Tei, In—Sb, In—Sb—Se, $Bi_2Te_3$, BiSe, $Sb_2Se_3$, $Sb_2Te_3$, and the like. Among them, especially preferable is the Ge chalcogen compound as the phase change material to be used in the present invention because it has an excellent durability for repeated recording and it can exhibit a remarkable effect to reduce the reproduction signal jitter value.

Moreover, it is preferable that the phase change recording film 4 have a thickness in the range from 18 nm to 30 nm. This range is based on the experiment result as follows.

For example, a phase change optical disc was prepared by successively forming on a substrate a first dielectric film with a thickness of 90 nm, a phase change recording film with a thickness of 15 nm, a second dielectric film with a thickness of 15 nm, and a light reflection film with a thickness of 150 nm. Moreover, a plurality of phase change optical discs were prepared while changing the thickness of the phase change recording film up to 40 nm.

Next, these phase change optical discs were intialized and on these phase change optical discs, a random EFM signal was recorded using a light emitting pattern shown in FIG. 2. After this first recording, the reflection factor was measured in the groove. Moreover, recording was repeatedly performed on these phase change optical discs. After 10000 times of recording, the reproduction signal jitter value was determined. The result of this experiment was as follows.

In the case of the phase change recording film thinner than 18 nm, the phase change recording film could not show a sufficient film stength, disabling to perform repeated recording with a high power laser such as the record power Ph equal to or above 15 mW. Moreover, in the case of the phase change recording film with a thickness greater than 30 nm, the reproduction signal jitter value after 10000 times of recording was equal to or above 10%, showing an unpreferable recording/reproduction characteristic, ie., insufficient durability after the repeated recording. Accordingly, it is preferable that the phase change recording film have a thickness in a range from 18 nm to 30 nm.

Moreover, the phase change recording film 4 may be formed, for example, by deposition, ion beam sputter, DC sputter, RF sputter, or other conventional methods.

The second dielectric film 5 is formed on the phase change recording film 4 using the similar materials and method as the first dielectric film 3. The second dielectric film 5 is formed in the same way as the first dielectric film, for obtaining the oxidation preventing effect of the phase change recording film 4 and the amplification effect by the laser beam multi-interference.

This second dielectric film 5 preferably has a thickness in a range from 10 nm to 30 nm. If the second dielectric film has a thickness smaller than 10 nm, a heat caused by the laser beam is easily transferred to the light reflection film and the function to prevent intrusion of water from outside is lowered. Moreover, if the second dielectric film has a thickness greater than 30 nm, the heat of the phase change recording film heated by the laser beam cannot be transferred to the light reflection film and a repeated recording/reproduction results in a significant deterioration of the phase change recording film.

The light reflection film 6 is formed on the second dielectric film 5. This light reflection film 6 serves as a reflection layer for reflecting an incident light coming through the substrate 2 and as a heat sink layer for preventing excessive heat accumulation in the phase change recording film 4.

The light reflection film 6 of the phase change optical disc according to the present invention is made from an Al alloy containing Cu in a range from 0.1 atomic % to 1 atomic %.

This enables to maintain at a proper level the heat conductivity of the light reflection film 6 itself in the phase change optical disc 1 according to the present invention, so that the phase change recording film 4 can be effectively cooled by this light reflection film 6. That is, in the phase change optical disc 1 according to the present invention, it is possible to obtain an optimal cooling effect of the phase change recording film 4 by the light reflection film 6, so that the phase change recording film 4 can accurately and effectively change its phase when subjected to a laser beam. As a result, in the phase change optical disc 1 according to the present invention, it is possible to reduce the reproduction signal jitter value and to provide a sufficient margin of the record power assuring the reproduction limit jitter value after the repeated recording, enabling to exhibit a stable recording/reproduction characteristic after the repeated recording, which enables to obtain an excellent recording/reproduction characteristic.

Moreover, in the phase change optical disc 1 according to the present invention, because the light reflection film 6 has an optimal cooling effect, the phase change recording film has an easy grade of temperature distribution by the repeated recording, which makes it difficult to change the composition of the phase change material of the phase change recording film 4. That is, in the phase change optical disc 1, it is possible to suppress the segregation of the phase change material caused by an uneven temperature distribution of the phase change recording film 4 due to the repeated recording. As a result, it is possible to improve the repeated recording durability.

Here, in the case of the light reflection film formed from an Al alloy containing Cu below 0.1 atomic % or above 1.0 atomic %, the phase change optical disc cannot have a preferable weather resistance. Accordingly, in the phase change optical disc 1 according to the present invention, when the light reflection film 6 is made from an Al alloy containing Cu in a range from 0.1 to 1.0 atomic %, it is possible to obtain an excellent weather resistance.

Here, the light reflection film 6 preferably has a thickness in a range from 50 nm to 300 nm, and more preferably from 150 nm to 200 nm. If the light reflection film has a thickness below 50 nm, the light reflection film 6 cannot easily make the heat go away and a repeated recording/reproduction results in a quick deterioration of the phase change recording film 4. Moreover, if the light reflection film 6 has a thickness greater than 300 nm, the heat can go away too quickly, and more record power is required at a write start, making it difficult to start a writing. This also requires more time for reproduction, lowering the productivity.

Moreover, this light reflection film 6 may be formed, for example, ion beam sputter, DC sputter, RF sputter, and other conventional methods. When forming the light reflection film 6 according to the present invention, for example, it is possible to simultaneously use an $Al_xCu_y$ target and an Al target for sputtering in an Ar gas atmosphere to form the light reflection film 6 made from an Al alloy containing a desired percentage of Cu. Here, by changing the film formation speeds of the respective targets, it is possible to control the Cu content. It should be noted that the present invention is not limited to use of two targets or simultaneous use of the targets. The two targets may also be used successively.

The protection film 7 is formed on the light reflection film 6. This protection film 7 functions to prevent oxidation of the phase change recording film 4 as well as to prevent generation of scars on the phase change recording film 4. Moreover, the protection film 7 may be formed by spin-coating a resin such as an ultraviolet-ray hardening resin or adhering a resin plate, a glass plate, or a metal plate onto the light reflection film 6 via an adhesive.

Figure 3:
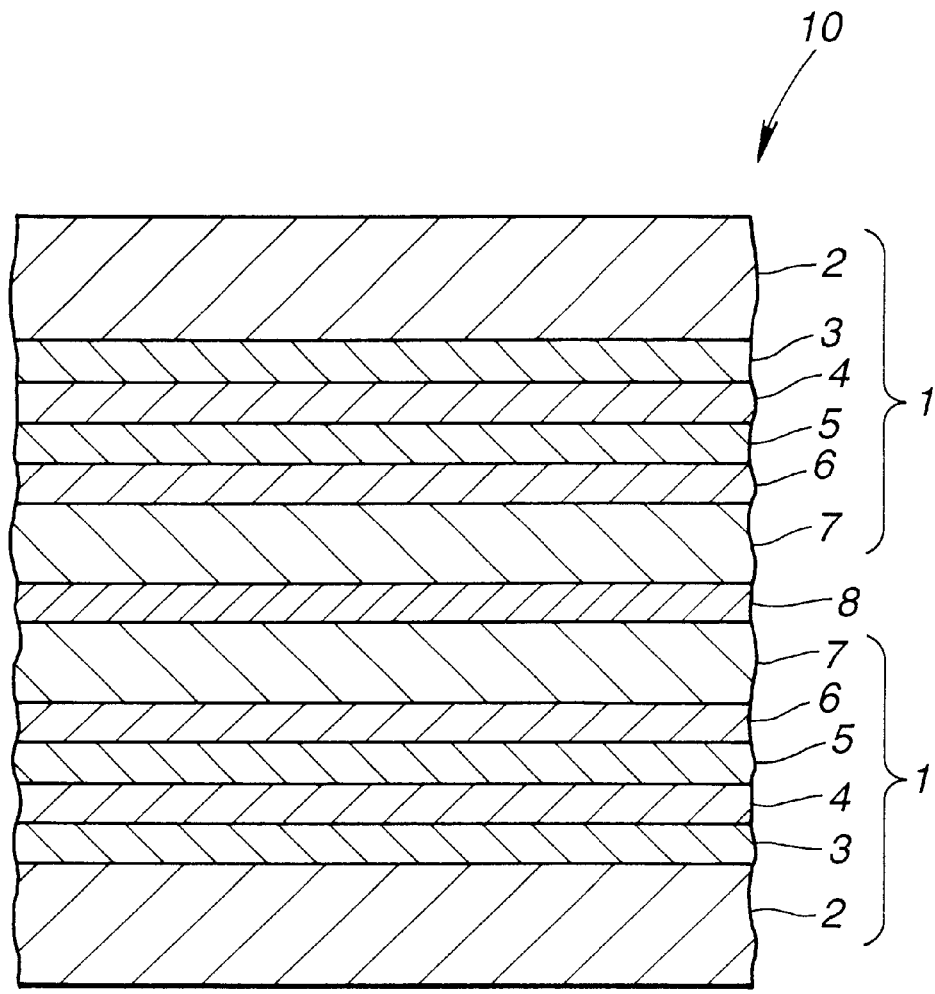
FIG. 3 is a cross sectional view of another example of the optical disc according to the present invention.

Moreover, this phase change optical disc 1 can also be used in combination with an identical phase change optical disc or an ordinary optical disc. That is, two optical discs are adhered to each other via an adhesive layer 8 so that their reflection films 6 are arranged inside, thus preparing a double-sided phase change optical disc 10 capable of recording/reproduction from both sides as shown in FIG. 3. It should be noted that in FIG. 3, a pre-groove formed on the substrate is not depicted.

As a phase change optical disc, for example, there has been suggested a double-sided phase change optical disc consisting of two substrates having a diameter of 120±0.3 mm, thickness of 0.6±0.03 mm, track pitch of 0.8±0.01 micrometers using an optical system having a linear velocity of 4.8 m/s and a relationship between the objective lens numerical aperture NA and the laser beam wavelength λ defined as λ/NA=(1.083−0.086) micrometers to (1.083+0.167) micrometers, thus enabling to assure a recording capacity of 3.0 GB/side. The present invention can preferably be applied to such a phase change optical disc.

In the phase change optical disc 1 having the aforementioned configuration, an information signal is recorded, erased, and reproduced as follows.

Firstly, in the phase change optical disc 1, as has been described above, after the successive formation of the first dielectric film 3, the phase change recording film 4, the second dielectric film 5, the light reflection film 6, and the protection film 7 on the substrate, initialization treatment is performed for initialization of the phase change recording film. 4

This initialization treatment is performed to make the phase change recording film 4 into 9 a uniform crystalline state prior to recording of an information signal. More specifically, a predetermined laser beam is uniformly applied over the entire surface of the phase change optical disc 1. Here, the phase change recording film 4 is headed to a temperature below a melting point of the phase change material constituting the phase change recording film 4 and above the crystallization temperature. The phase change recording film 4 of the phase change optical disc 4 is cooled down into a uniform crystalline state to be initialized.

Next, the phase change optical disc 1 thus initialized is mounted on a recording/reproduction apparatus and rotated at a predetermined linear velocity for performing recording/reproduction.

Firstly, when recording an information signal on to the phase change optical disc 1, a laser beam of a strong power is applied to the phase change recording film 4. The portions to which the laser beam are applied are rapidly heated above the melting point, after which the portions are suddenly cooled down into an amorphous state. Thus, in the phase change optical disc 1, an information signal is recorded as a record mark of the phase change material in the amorphous state on the phase change recording film 4 in the crystalline state. The laser power used here is the aforementioned record power.

Moreover, when erasing an information signal recorded on the phase change optical disc 1, a laser beam weaker than the record power is applied onto the record mark, so that the portion of the phase change recording film 4 where the laser beam is applied is heated above the crystallization temperature but below the melting point, after which the portion is gradually cooled down into a crystalline state regardless of the previous state. Thus, in this phase change recording film 4, the record mark of the amorphous state as an information signal is converted into a crystalline state, thus erasing the information signal. The laser power used here is the aforementioned erase power.

Moreover, when reproducing the information signal thus written on the phase change optical disc 1, a laser beam having a small power not causing the phase change of the phase change recording film 4 is applied, so that a return beam of the laser beam is received.

In the phase change optical disc 1, the reflection factor of the phase change recording film 4 in the crystalline state is greater than the reflection factor of the phase change recording film 4 in the amorphous state. Accordingly, the recording/reproduction apparatus receives the return beam from the phase change recording film 4 and detects a difference between the reflection factors between the crystalline state and the amorphous state of the phase change recording film 4, thus reproducing the information signal. The laser power used here is the cooling power.

Moreover, the phase change optical disc 1 having the aforementioned configuration is prepared, for example, as follows.

Firstly, a substrate 2 is prepared from polycarbonate with a predetermined groove by injection molding. On this substrate 2, a first dielectric film 3 is formed from ZnS—SiO$_2$ by means of the RF sputter method.

Next, on the first dielectric film 3, a phase change recording film 4 is formed from GeSbTe by means of the DC sputter method. On this phase change recording film 4, a second dielectric film 5 is formed from ZnS—SiO$_2$ by means of the RF sputter method.

Next, on this second dielectric film 5, a light reflection film 6 was formed by simultaneously using an Al$_x$Cu$_y$ target and an Al target for sputtering in an Ar gas atmoshpere so as to form the light reflection film 6 from an Al alloy containing a desired percentage of Cu. Here, by changing the film formation speeds of the respective targets, the Cu content was controlled.

Next, this light reflection film was covered with an ultraviolet-ray hardening resin applied by spin coating to prepare the phase change optical disc 1.

In order to prepare a double-sided phase change optical disc 10, for example, two of the phase change optical discs 1 are adhered to each other so that their reflection films 6 are arranged inside. It should be noted that the phase change optical disc 10 may also be preared by using the phase change optical disc 1 in combination with a conventional ordinary optical disc.

EXAMPLES

Hereinafter, explanation will be given on actual examples of the present invention according to experiment results.

In order to evaluate the record power margin in a repeated recording by the phase change optical disc according to the present invention, following phase change optical discs were actually prepared.

Example 1

Firstly, a substrate was prepared with a diameter of 120 mm, thickness of 0.6 mm, and a track pitch of 0.8 micrometers.

Next, on this substrate, a first dielectric film was formed from ZnS—SiO$_2$ with a thickness of 90 nm by way of sputtering.

Next, on this first dielectric film, a phase change recording film was formed using a Ge$_2$Sb$_2$Te$_5$ target in an Ar gas atmosphere by way of sputtering.

Next, on this phase change recording film, a second dielectric film was formed from ZnS—SiO$_2$ with a thickness of 15 nm by way of sputtering.

Next, on this second dielectric film, a light reflection film was formed by simultaneously sputtering an Al$_{98}$Cu$_2$ target and an Al target in an Ar gas atmosphere so as to obtain a film thickness of 15 nm made from an Al$_{95.5}$Cu$_{0.5}$ alloy containing 0.5 atomic % of Cu. Here, the Cu content was controlled by changing the film formation speeds by the $Al_{98}Cu_2$ target and the Al target.

Next, this light reflection film was covered with an ultraviolet-ray hardening resin by way of spin coating thereby to obtain a single-sided phase change optical disc.

Two of the aforementioned single-sided phase change optical discs were prepared and bonded to each other with an adhesive so that their reflection films are arranged inside. Thus, a double-sided phase change optical disc was prepared with a diameter of 120 mm and thickness of 1.2 mm.

Comparative Example 1

A double-sided phase change optical disc was prepared in the same way as Example 1 except for that the reflection film was prepared from an AlTi alloy containing no Cu with a thickness of 15 nm.

Evaluation of Jitter Value after Repeated Recording and Repeated Recording Durability Using the phase change optical discs of Example 1 and Comparative Example 1, recording and reproduction were performed as follows.

Firstly, the respective phase change optical discs were initialized and using the light emitting pattern shown in FIG. 2, a random EFM signal was recorded onto the respective phase change optical discs by a recording/reproduction apparatus under the condition as follows: laser beam wavelength 650 nm, linear velocity 4.8 m/s, recording power Ph 14.0 mW, erase power Pl 5.6 mW, and cooling power 1.5 mW.

Figure 4:
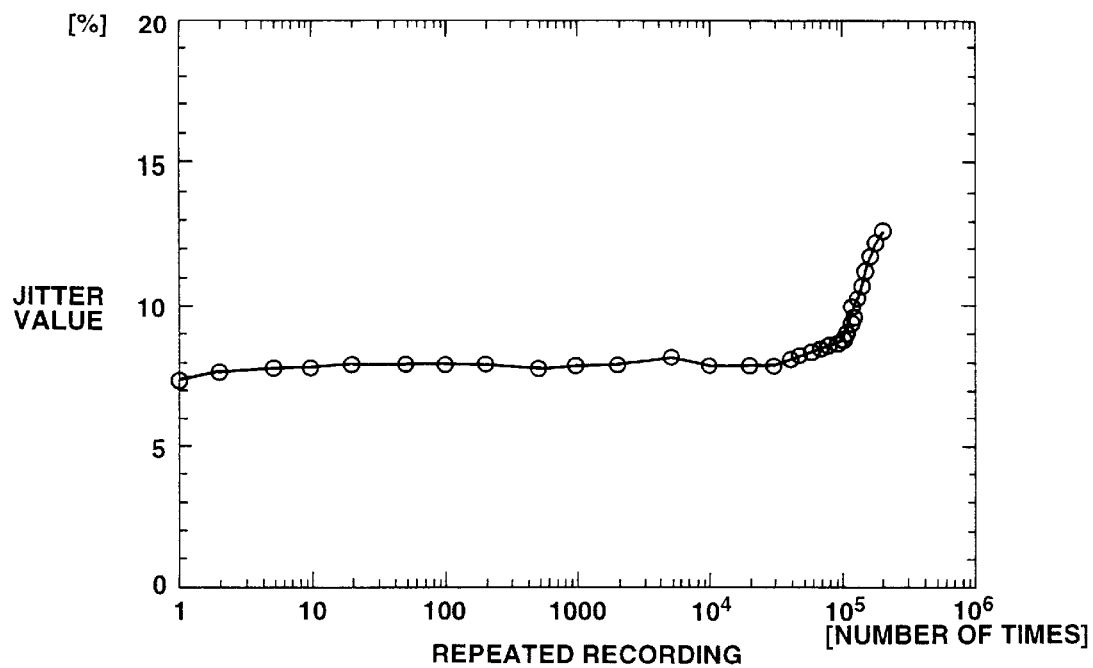
FIG. 4 shows a relationship between the repeated recording count and the reproduction signal jitter value obtained by using an example of the optical disc according to the present invention.

Under this condition, recording was repeatedly performed a number of times. After this repeated recording, the reproduction signal jitter value was determined. FIG. 4 shows a result of Example 1, and FIG. 5 shows a result of Comparative Example 1.

Here, the jitter value is a standard deviation of mark edges against a clock, the deviation being normalized by a window width. If this jitter value is equal to or below 10%, it is considered that an error can effectively be corrected. This jitter value 10% will be used below as a criteria for a preferable media characteristic.

As is clear from the result of FIG. 4, in the Example 1 using the light reflection film formed from an Al alloy containing 0.5 atomic % of Cu, the jitter value is stable around 8%. Even after the recording was repeated 100,000 times, the jitter value was equal to or below 10%, assuring a preferable repeated recording durability.

Figure 5:
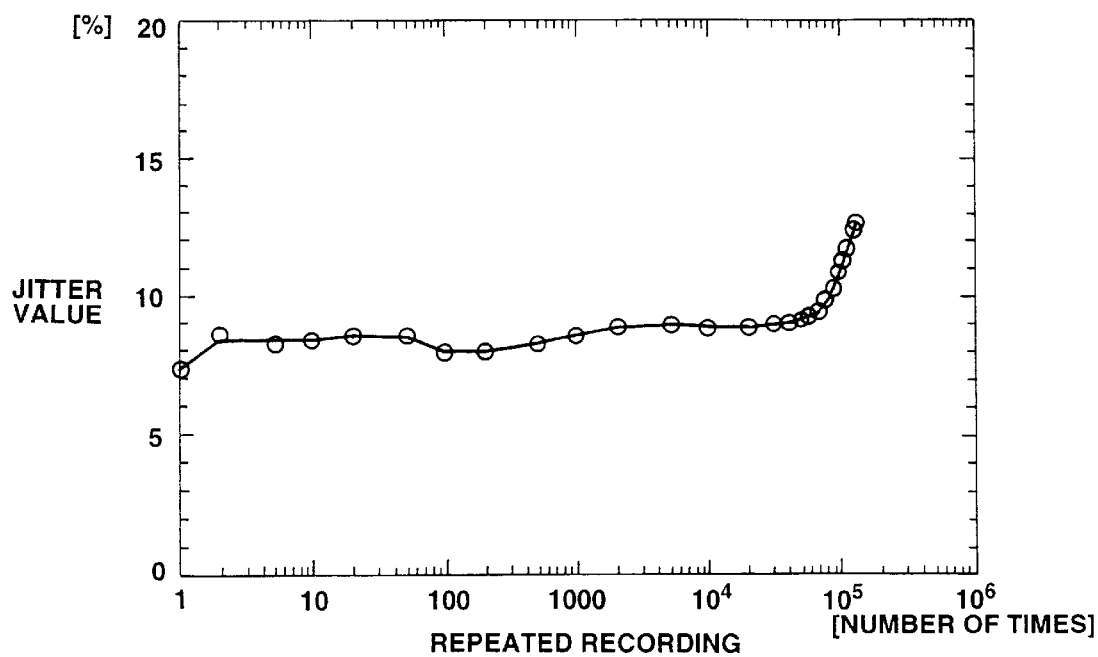
FIG. 5 shows a relationship between the repeated recording count and the reproduction signal jitter value obtained by using a comparative example of the optical disc.

On the other hand, as is clear from a result of FIG. 5, in the Comparative Example 1 in which the light reflection film was formed from an AlTi alloy containing no Cu, the jitter value fluctuates more than the jitter value of Example 1 shown in FIG. 4. After the repetition of 100,000 times, the jitter value was equal to or above 10%.

Thus, it was found that by forming a light reflection film from an Al alloy containing Cu, it is possible to reduce the jitter value and improve the repetition durability.

Evaluation of the Power Margin

Figure 6:
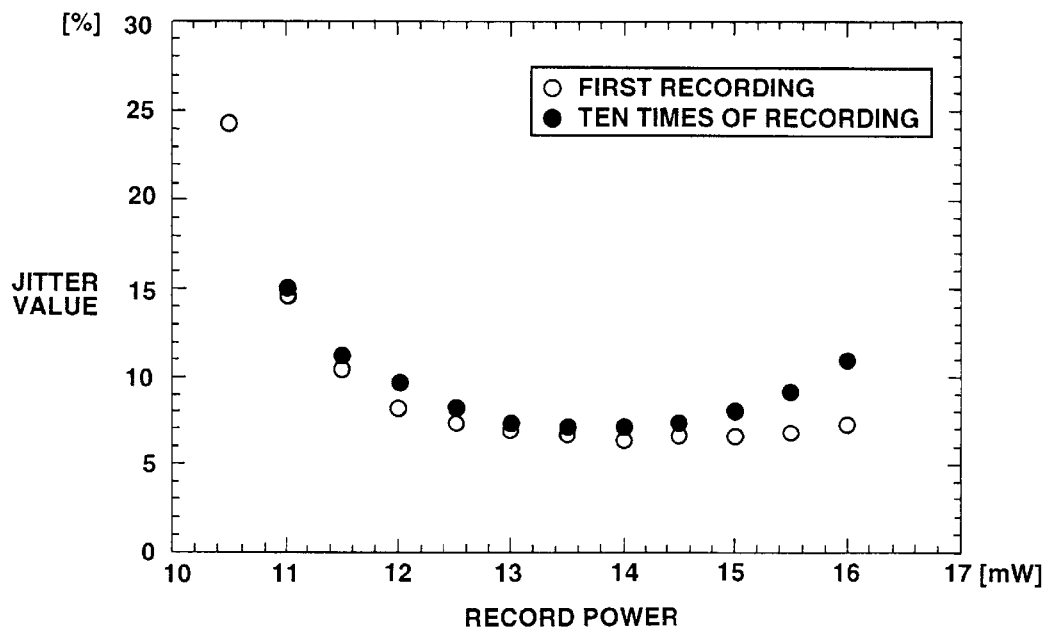
FIG. 6 shows a relationship between the record power and the reproduction signal jitter value obtained by using an example of the optical disc according to the present invention.
Figure 7:
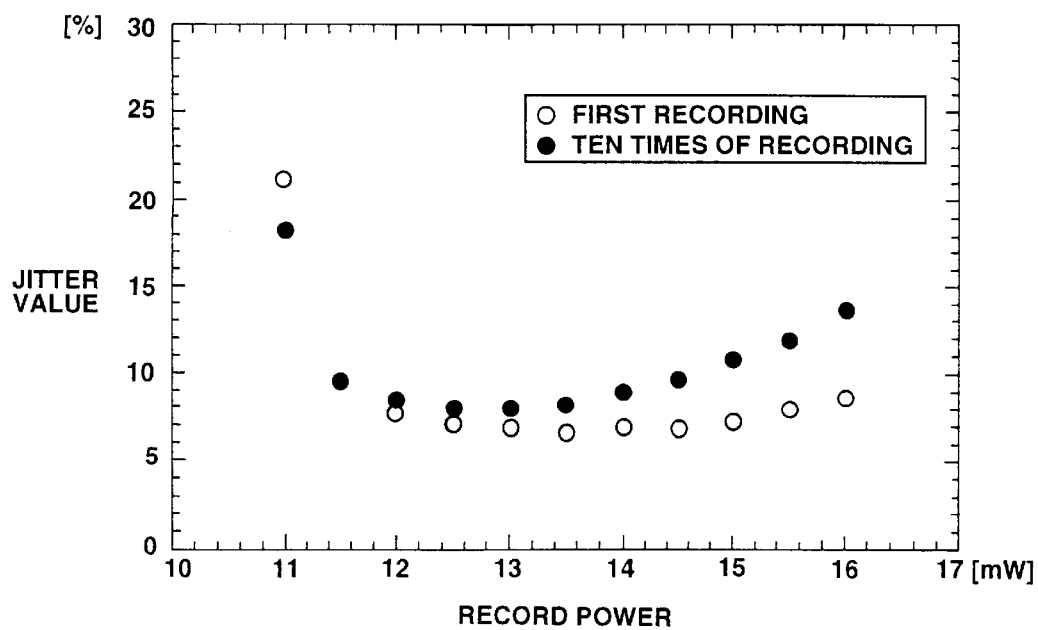
FIG. 7 shows a relationship between the record power and the reproduction signal jitter value obtained by using a comparative example of the optical disc.

Moreover, in the aforementioned recording condition, the ratio Pl/Ph of the erase power Pl and the record power Ph was fixed to 0.4 while changing the record power Ph value, and recording was repeated 10 times to the phase change optical discs of Example 1 and Comparative Example 1, so as to determine the jitter values after one recording and after 10 times of recording. FIG. 6 shows a result of Example 1 and FIG. 7 shows a result of Comparative Example 1.

If FIG. 6 is compared to FIG. 7, it can be said that Example 1 using the light reflection film made from an Al alloy containing Cu shows jitter values smaller than the Comparative Example 1 using an ordinary light reflection film containing no Cu, and has a wider record power range in which the jitter value is equal to or below 10%. That is, Example 1 has a wider record power margin than Comparative Example 1.

More specifically, as shown in FIG. 6, for example, in Example 1, with the record power of 15 mW, the jitter value after the first recording was 6.8% and the jitter value after 10 times for recording was 8%. On the other hand, as shown in FIG. 7, in Comparative Example 1, for example, with the record power of 15 mW, the jitter value after the first recording was 7.5%, and the jitter value after ten times of recording was 10.8%. Thus, in Example 1, the jitter value was reduced compared to Comparative Example 1.

Moreover, as shown in FIG. 6, in Example 1, with respect to the optimal record power 14 mW where the jitter value is minimum after ten times of recording, the recording power margin of the jitter value equal to or below 10% is about ±15%. In other words, in Example 1, the record power width where the jitter value is equal to or below 10% after ten times of recording is about 4 mW from 12 mW to 16 mW.

On the other hand, in Comparative Example 1 shown in FIG. 7, with respect to the optimal record power 12.5 mW where the jitter value is minimum, the record power margin of the jitter value equal to or below 10% is about ±11%. In other words, in Comparative Example 1, the record power width for the jitter value equal to or below 10% after ten times of recording is 3 mW from 11.5 mW to 15.5 mW. Thus, Example 1 can have a greater record power margin than Comparative Example 1.

Thus, it has been found that by forming the light reflection film from an Al alloy containing Cu, it is possible to increase the record power range assuring the jitter value at the reproduction limit level, i.e., to obtain a wider record power margin.

Next, in order to evaluate the relationship between the Cu content in the light reflection film and the weather resistance, following optical discs were prepared.

Example 2

A double-sided phase change optical disc was prepared in the same way as Example 1 except for that a light reflection film was formed by changing the film formation speeds by the $Al_{98}Cu_2$ target and the Al target so as to obtain a light reflection film with a thickness of 15 nm made from an $Al_{99.25}Cu_{0.75}$ alloy containing 0.75 atomic % of Cu.

Comparative Example 2

A double-sided phase change optical disc was prepared in the same way as Example 1 except for that a light reflection film was formed by changing the film formation speeds by the $Al_{98}Cu_2$ target and the Al target so as to obtain a light reflection film with a thickness of 15 nm made from an $Al_{99.9}Cu_{0.1}$ alloy containing 0.1 atomic % of Cu.

Comparative Example 3

A double-sided phase change optical disc was prepared in the same way as Example 1 except for that a light reflection film was formed by changing the film formation speeds by the $Al_{98}Cu_2$ target and the Al target so as to obtain a light reflection film with a thickness of 15 nm made from an $Al_{99.0}Cu_{1.0}$ alloy containing 1.0 atomic % of Cu.

Evaluation of the Relationship Between the Cu Content in the Light Reflection Film and the Weather Resistance The phase change optical discs of Example 1, Example 2, and Comparative Examples 2 and 3 were left under a condition of temperature 80° C. and humidity 85% for 1000 hours. After this, each of the phase change optical discs was observed using a microscope set to 100 magnification to evaluate the weather resistance. The evaluation results are shown in Table 1, wherein a circle (◯) indicates that no deterioration was observed on the surface of the phase change optical disc and a cross (X) indicates that deterioration was observed on the surface of the phase change optical disc. It should be noted that "pinhole" indicates that a hole is present in the film constituting the phase change optical disc, "corrosion" indicates that a chemical battery was formed between materials of the phase change optical disc, deteriorating the film constituting the phase change optical disc.

TABLE 1

| | | Weather resistance | Pinhole | Corrosion |
|---|---|---|---|---|
| Example 1 | AlCu (0.5 atomic %) | ◯ | ◯ | X |
| Example 2 | AlCu (0.75 atomic %) | ◯ | ◯ | ◯ |
| Comp. Ex. 2 | AlCu (0.1 atomic %) | X | X | ◯ |
| Comp. Ex. 3 | AlCu (1.0 atomic %) | X | ◯ | ◯ |

As is clear from Table 1, in the Comparative Example 2 having the light reflection film formed from the Al alloy containing 0.1 atomic % of Cu, a pinhole was generated, showing an inferior weather resistance. Moroever, in the Comparative Example 3 having the light reflection film formed from the Al alloy containing 1.0 atomic % of Cu, corrosion was observed, showing an inferior weather resistance.

Consequently, it can be said that when the light reflection film is formed from an Al alloy containing Cu in a range from 0.1 to 1.0 atomic %, it is possible to obtain an excellent weather resistance.

As has thus far been described, the optical disc according to the present invention includes a recording layer having at least a phase change film whose phase changes between a crystalline state and an amorphous state enabling to record an information signal; and a light reflection film formed on the recording layer, from an Al alloy containing Cu in a range from 0.1 to 1.0 atomic %.

In the optical disc having the aforementioned configuration according to the present invention, the light reflection film can maintain a preferable level of heat conductivity, which in turn enables to obtain an optimal cooling efficiency of the recording layer, so that the phase change film subjected to a beam can change its phase accurately and effectively for an information signal. As a result, it is possible to obtain a wide margin range of record power capable of assuring the reproduction limit jitter value after a repeated recording. Thus, even after a repeated recording, it is possible to obtain a preferable recording/reproduction characteristic.

Moreover, the optical disc according to the present invention has the light reflection film constituted by an Al alloy containing Cu in the aforementioned range and can exhibit an excellent weather resistance.

Consequently, the optical disc according to the present invention can exhibit a preferable recording/reproduction characteristic even after a repeated recording as well as an excellent weather resistance, enabling to obtain a high reliability.

What is claimed is:

1. An optical disc comprising:

a substrate;

a first dielectric film formed on the substrate and comprised of $ZnS—SiO_2$ and having a thickness ranging from about 70 nm to 130 nm;

recording layer including at least a phase change film whose phase is changed between a crystalline state and an amorphous state thereby to record an information signal, said phase change recording film formed on the first dielectric film and made from a chalcogen compound containing Ge and having a thickness ranging from about 18 nm to about 30 nm;

a second dielectric film formed on the phase change recording film comprising $ZnS—SiO_2$ and having a thickness ranging from about 10 nm to 30 nm;

a light reflection film formed on said recording layer and constituted by an Al alloy containing Cu in a range from 0.1 to 1.0 atomic %.

2. An optical disc as claimed in claim 1, wherein said light reflection film has a thickness in a range from 50 nm to 300 nm.

3. An optical disc as claimed in claim 1, wherein said recording film and said light reflection film are formed on a substrate which has a diameter in a range of 120±0.3 mm and a thickness in a range of 0.6±0.03 mm, and a track pitch in a range of 0.8±0.01 micrometers.

* * * * *